(12) United States Patent
Smestad et al.

(10) Patent No.: US 8,109,239 B1
(45) Date of Patent: Feb. 7, 2012

(54) INTERACTIVE PET TOY HAVING EXTENDABLE AND RETRACTABLE FLEXIBLE TARGET

(75) Inventors: Brad Smestad, Kent, WA (US); Steven Tsengas, Fairport Harbor, OH (US)

(73) Assignee: OurPet's Co., Fairport Harbor, OH (US)

( * ) Notice: Subject to any disclaimer, the term of this patent is extended or adjusted under 35 U.S.C. 154(b) by 148 days.

(21) Appl. No.: 12/465,305

(22) Filed: May 13, 2009

Related U.S. Application Data

(60) Provisional application No. 61/052,812, filed on May 13, 2008.

(51) Int. Cl.
*A01K 29/00* (2006.01)
(52) U.S. Cl. ........................................ 119/707; 119/702
(58) Field of Classification Search .................. 119/702, 119/707, 708, 789; 40/412, 414
See application file for complete search history.

(56) References Cited

U.S. PATENT DOCUMENTS

| | | | | |
|---|---|---|---|---|
| 3,353,823 A * | 11/1967 | Sobel | ............... | 472/54 |
| 3,699,698 A * | 10/1972 | Shiu | ................. | 40/419 |
| 4,803,953 A * | 2/1989 | Graves | ............ | 119/707 |
| 5,074,820 A * | 12/1991 | Nakayama | ....... | 446/29 |
| 5,247,754 A * | 9/1993 | Belokin, Jr. | ...... | 40/414 |
| 5,785,005 A * | 7/1998 | Udelle et al. | ...... | 119/706 |
| 6,045,430 A * | 4/2000 | How | ............... | 446/236 |
| 6,220,921 B1 * | 4/2001 | Kim | ............... | 446/308 |
| 6,371,053 B1 * | 4/2002 | Tsengas | .......... | 119/707 |
| 6,510,817 B2 | 1/2003 | Horvath | | |
| 6,571,742 B1 | 6/2003 | Tsengas | | |
| 6,591,785 B1 | 7/2003 | Boshears | | |
| 6,684,819 B1 * | 2/2004 | Locke | ............. | 119/707 |
| 6,892,675 B1 | 5/2005 | Comerford | | |
| 7,631,617 B1 * | 12/2009 | Tsengas | .......... | 119/707 |
| 7,823,541 B2 * | 11/2010 | Comerford | ..... | 119/707 |

* cited by examiner

*Primary Examiner* — Kimberly Smith
(74) *Attorney, Agent, or Firm* — John D. Gugliotta, Esq.

(57) ABSTRACT

A toy is provided that simulates a mouse tail moving randomly in and out and back and forth about the access orifice, thereby catching the pet's attention and stimulating the animal's instinctive curiosity.

7 Claims, 7 Drawing Sheets

INTERACTIVE PET TOY HAVING EXTENDABLE AND RETRACTABLE FLEXIBLE TARGET

RELATED APPLICATIONS

The present application claims benefit of U.S. Provisional Application 61/052,812, filed on May 13, 2008 and incorporated by reference herein as if rewritten in its entirety.

BACKGROUND OF THE INVENTION

1. Field of the Invention

The present invention relates generally to animal amusement devices and, more particularly, to a novel interactive toy for pets.

2. Description of the Related Art

Many devices for promoting play and interaction with a pet are in existence today. Such toys, to be effective, must stimulate some instinctive behavior in the animal in order to garner, and retain, the animal's interest in the interaction. These toys can entertain a cat, dog or other pet; however, if the reaction of the toy becomes predictable the pet's attention tends to wain.

Motor powered toys are also known. These toys have a supported toy-like object that is moved mechanically in a manner that may attract the pet. However, this type of device does not promote interaction between the pet and the toy in that the motion imparted by the motor tends to be more automated and eventually generates a predictable movement pattern.

The above games tend to be of a type that may be labeled "pursuit-type" games, in that the toy is moved and the pet chases it. This type of game depends for its entertainment value on the pet being close enough to success in catching the toy to make the pet attempt to catch it, yet not close enough that it is overly easy. Such games often become equated by the pet to the game of "fetch". Some pets are simply uninterested in this game.

For the foregoing reasons, there is a need for a new type of pet and owner game that is more entertaining than the above summarized games. The new game should provide a structure that promotes a game that is of a type that is more nearly related to the human game of hide-and-seek, or the baby game of peekaboo, and that will capitalize on animals, particularly domestic animals innate interest in hit-and-run and ambush-type games where the hunter is rewarded for his patience. The game should be attractive to both young and old pets, and should maximize interaction between the pet and owner, while somewhat downplaying the need for continuous strenuous physical activity on the part of the pet, which may result in lessened interest.

A search of the prior art did not disclose any patents that read directly on the claims of the instant invention; however, the following references were considered related.

U.S. Pat. No. 6,591,785 to Boshears teaches a cat's toy having a cheese housing with at least one port through its sidewall. A toy mouse is supported on a linkage within the housing. The linkage reciprocates a portion of the mouse through the port so that the "'mice" emerge from and return into the 'cheese'". Sensors detect cat's motion proximate to the housing. A drive system is responsive to the sensor.

U.S. Pat. No. 6,510,817 to Horvath teaches a mouse and cheese cat toy, wherein a simulated mouse is propelled to appear in various locations (holes) relative to a simulated cheese face.

U.S. Pat. No. 6,571,742 to Tsengas teaches an interactive pet toy having a mouse that selectively extends from and retracts into a cheese housing.

Consequently, a need has been felt for providing a new type of pet and owner game that is of a type more nearly related to the human game of hide-and-seek, or the baby game of peekaboo, and that will capitalize on animals, particularly domestic animals innate interest in hit-and-run and ambush-type games where the hunter is rewarded for his patience.

SUMMARY OF THE INVENTION

Therefore, it is an object of the present invention to provide an interactive pet toy game.

It is another object of the present invention to provide an outer housing for holding the operational mechanism for a toy-like object.

It is another object of the present invention to provide a toy-like object which includes a randomly moved object that would be appealing to an animal.

It is another object of the present invention to provide an interactive toy which includes a means for extending or projecting the object through an opening in the housing at least a short distance outside of the housing.

It is another object of the present invention to provide a means capable of randomly extending and retracting from the housing, within the view of the pet to peak the animal's interest and curiosity.

It is still another object of the present invention to provide an interactive pet toy game that is attractive to both young and old pets, and that maximizes interaction with the pet.

Briefly described according to one embodiment of the present invention, an interactive pet toy is provided. The pet toy of the present invention comprises an outer housing for holding and obscuring a motorized mechanism for urgin an elongated, flexible target through an access/egress port. The port provides access to a cavity that is otherwise obscured by the housing. A propeller-like blade mechanism is driven by the motorized mechanism to provide both circulating motion, as well as a minor airflow out the egress port. A ribbon-like flexible, elongated target is attached at one end to the distal end of the blade.

As the blade reciprocates back and forth, the elongated target is moved in and out of the egress port. Further, as the blade circulates, a slight airflow is created forming a draft outward from the egress port. This draft tends to carry the ribbon-like target out the egress port. The vortex flow motion of the draft will cause the target to undulate, or "wave". Simultaneously, as the blade circulates the target will be drawn into and released from the egress port in a reciprocating fashion forming an attractive, undulating motion.

The toy thereby simulates a mouse tail moving randomly in and out and back and forth about the access orifice, thereby catching the pet's attention and stimulating the animal's instinctive curiosity.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

DESCRIPTION OF THE PREFERRED EMBODIMENT

1. Detailed Description of the Figures

Figure 1:
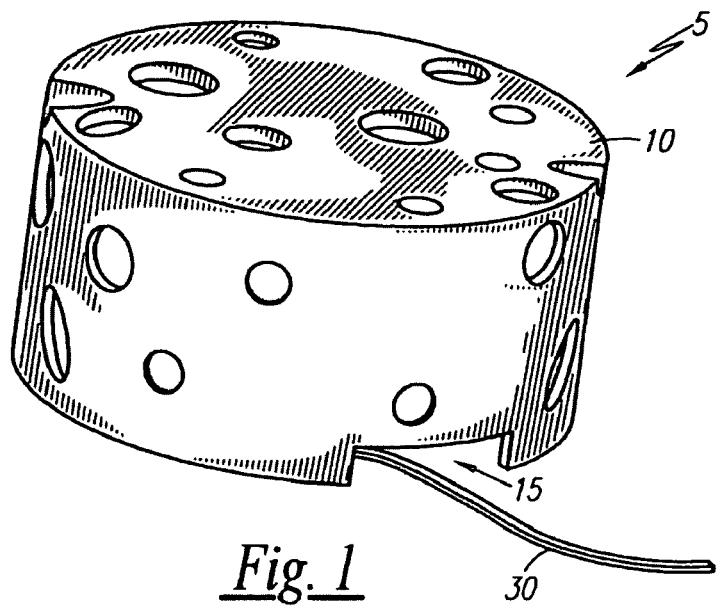
FIG. 1 is a top perspective view of an interactive pet toy according to a first preferred embodiment of the present invention.
Figure 2:
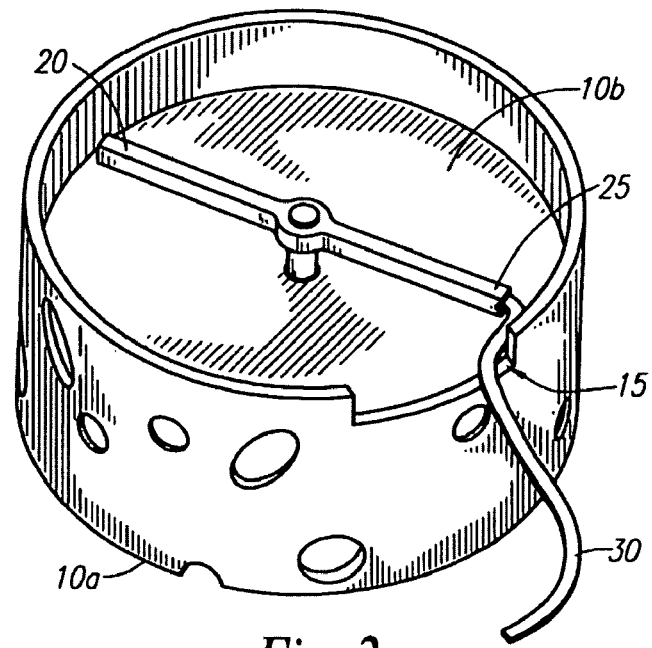
FIG. 2 is an bottom perspective view thereof.
Figure 3A:
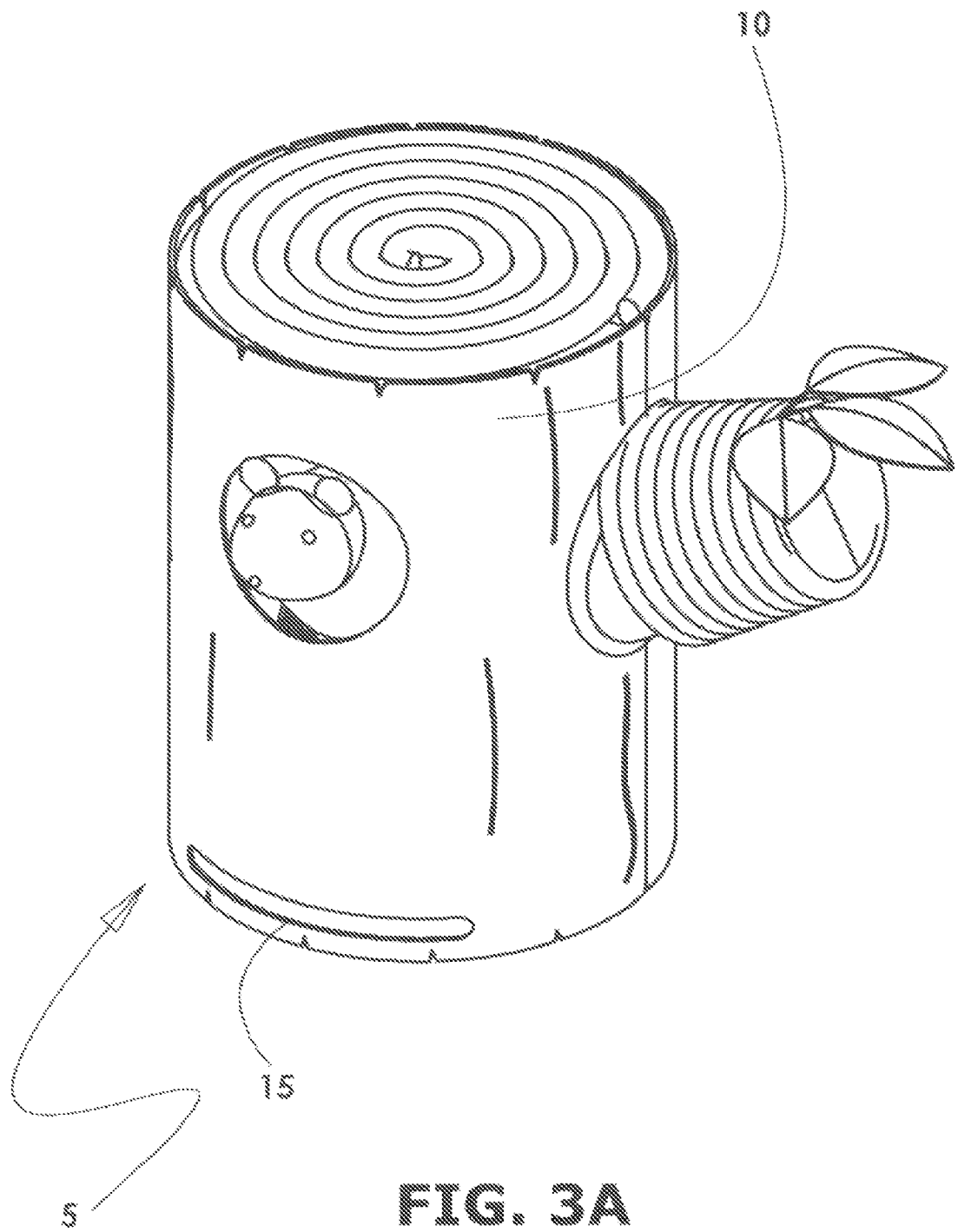
FIG. 3A is a front perspective view of an interactive pet toy according to a second preferred embodiment of the present invention.
Figure 3B:
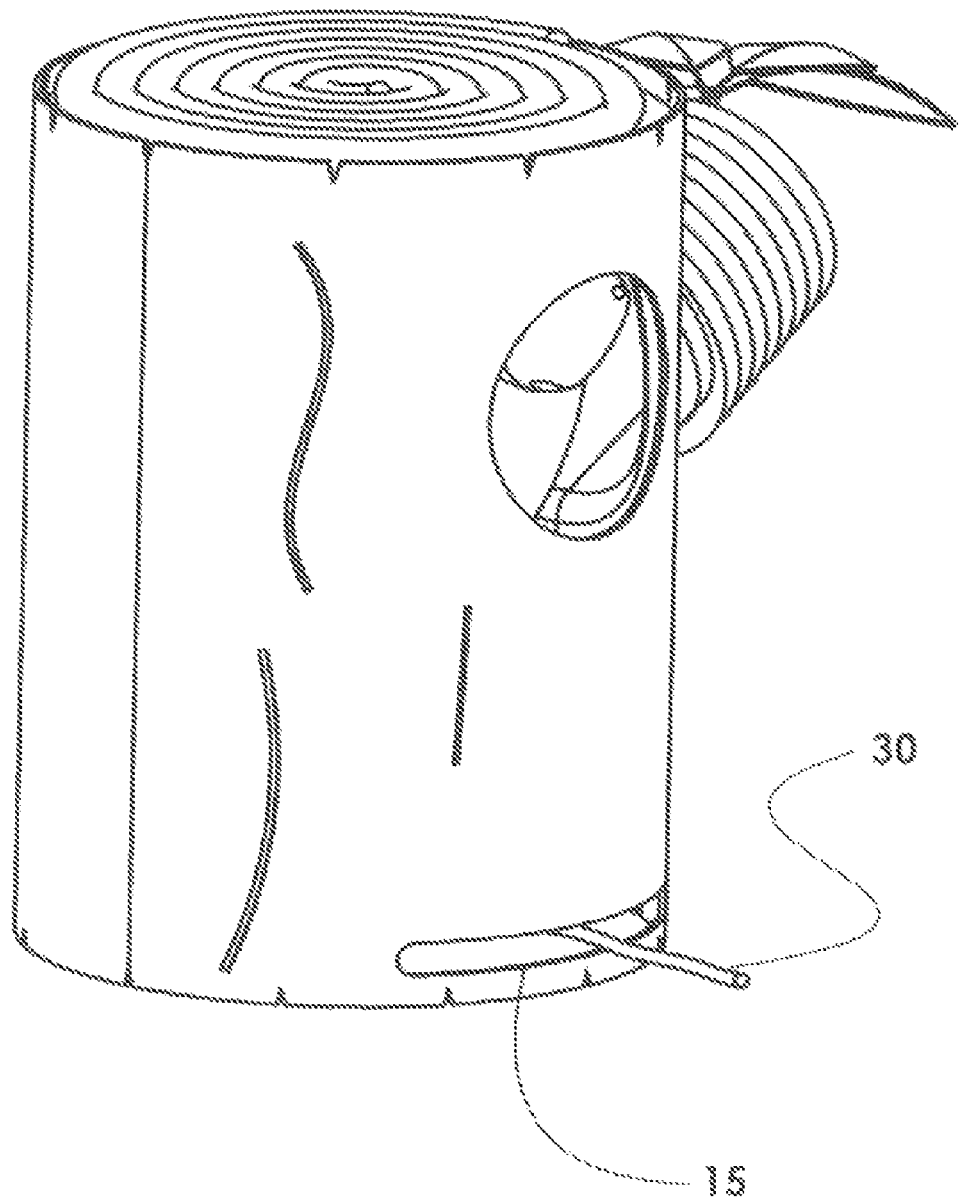
FIG. 3B is a rear perspective view thereof.
Figure 4:
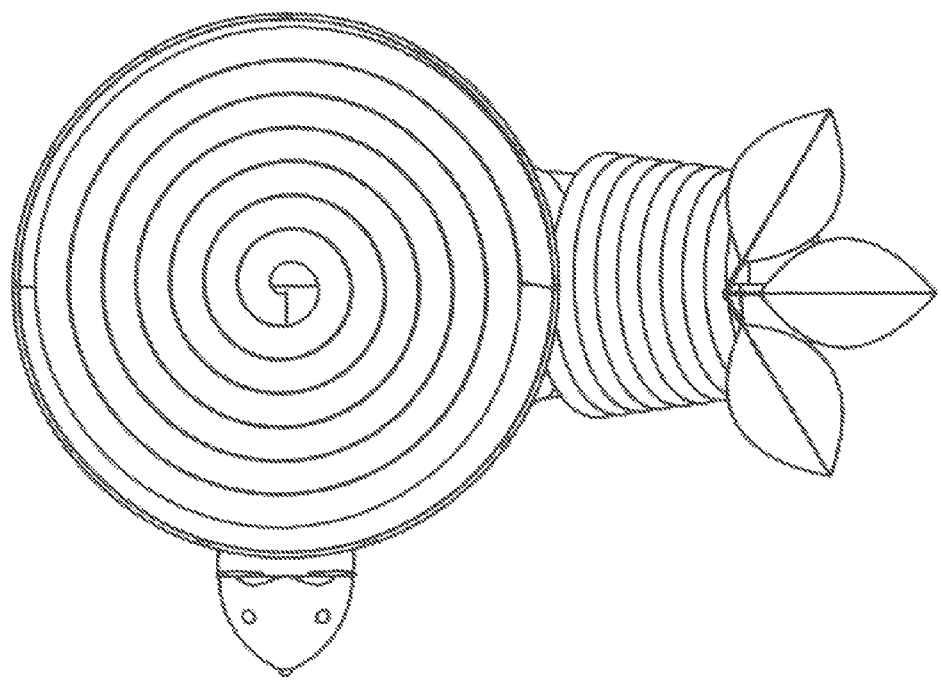
FIG. 4 is a top plan view thereof.
Figure 5:
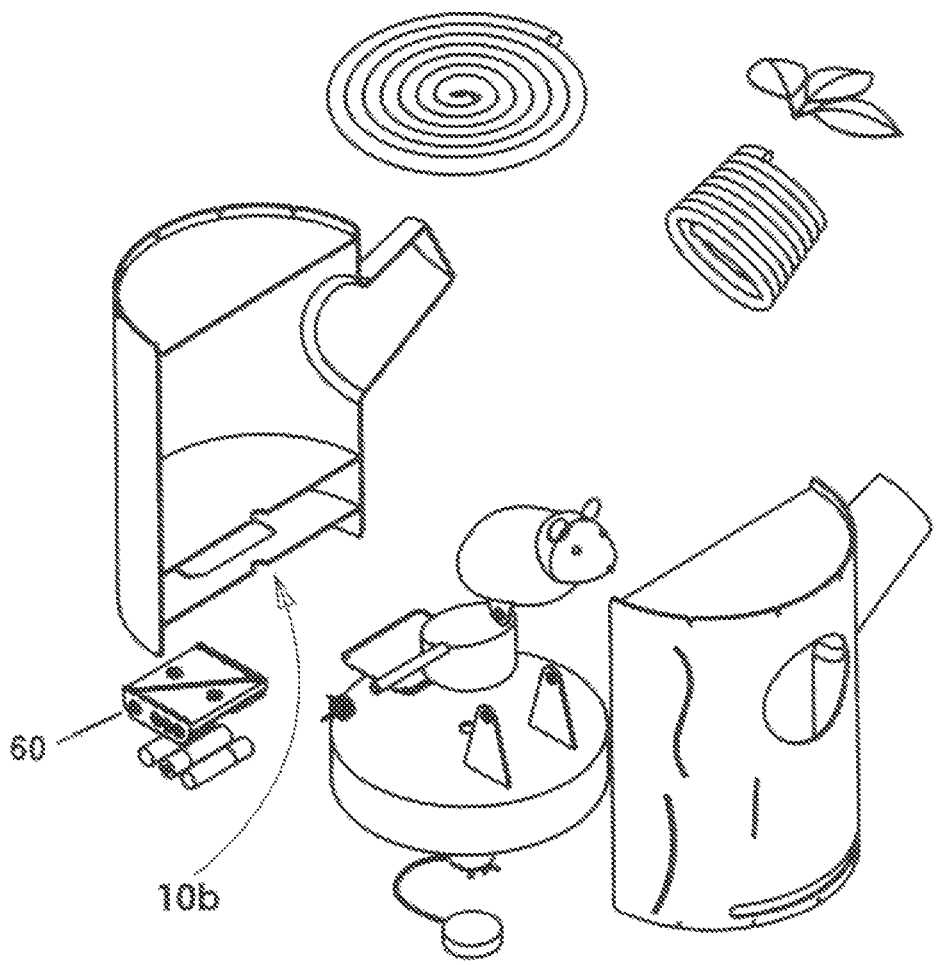
FIG. 5 is an exploded perspective view thereof.
Figure 6A:
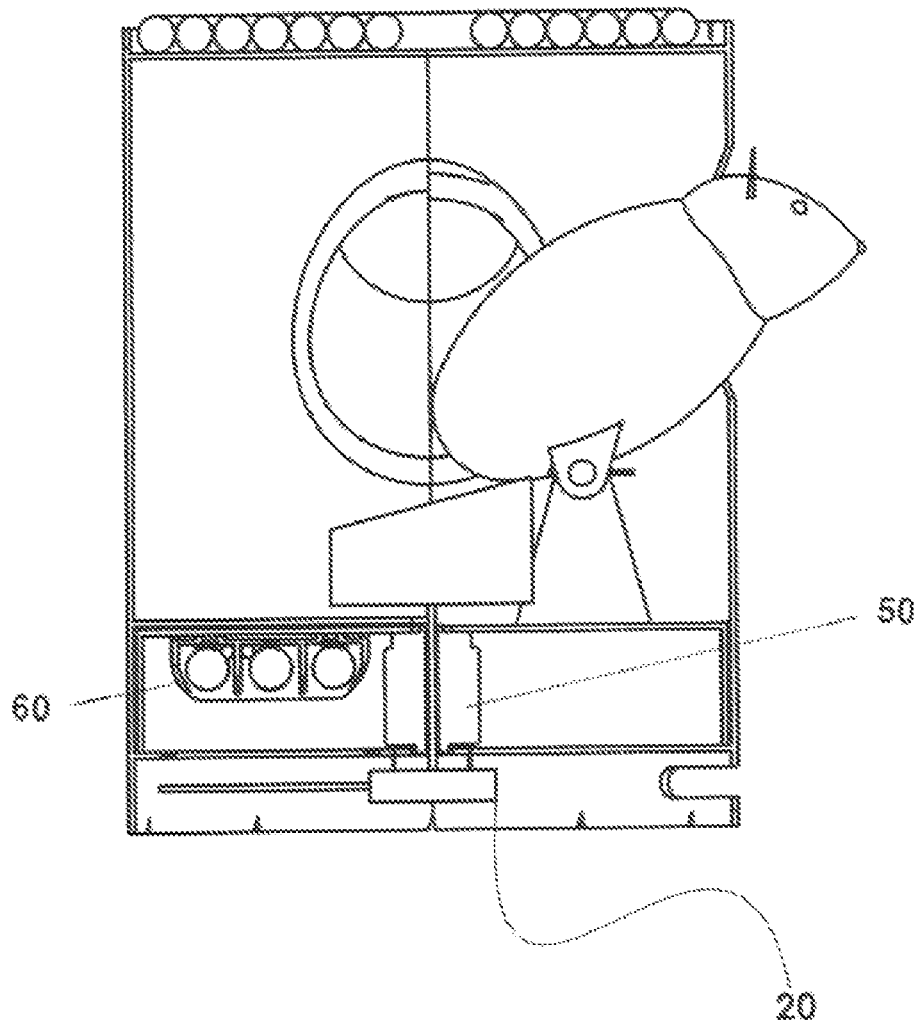
FIG. 6A is a partial cut elevational view thereof shown in an extended configuration.
Figure 6B:
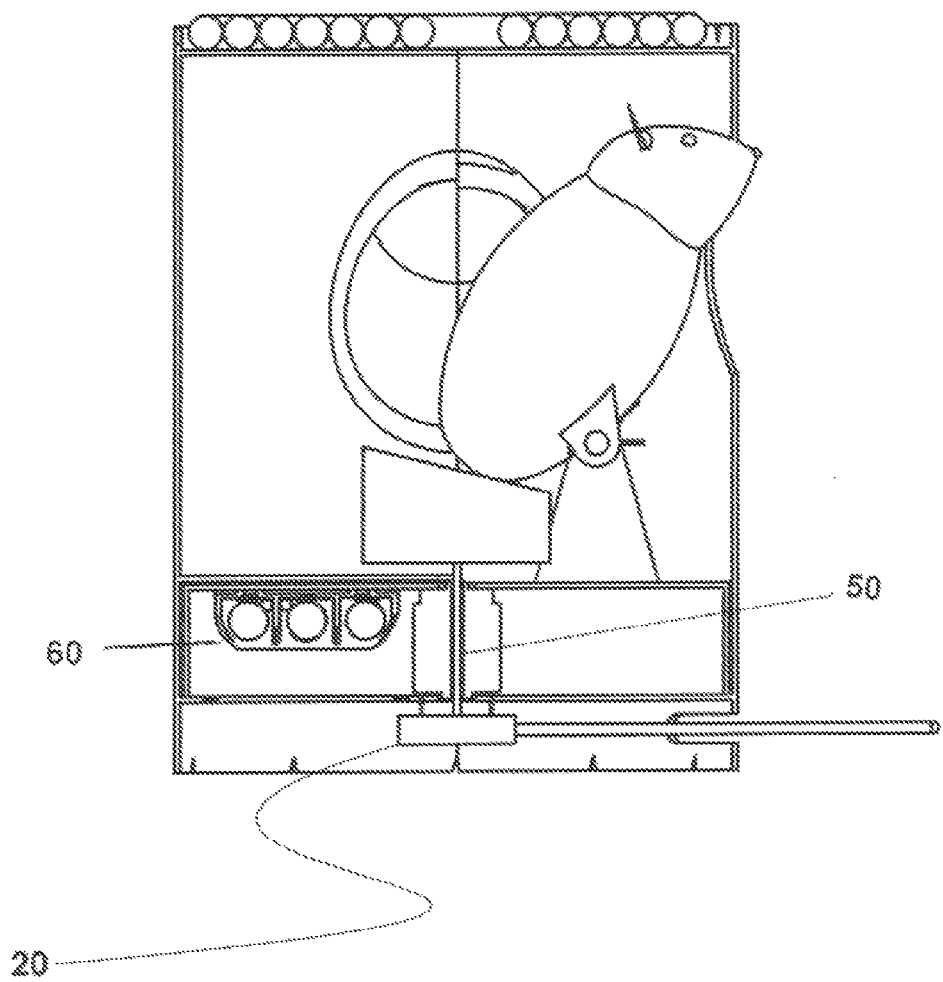
FIG. 6B is a partial cut elevational view thereof shown in a retracted configuration.

Referring now to FIGS. 1-6, an interactive pet toy 5 is shown, according to the present invention, comprised of a housing 10 formed so to an aesthetic or iconic shape, herein shown as a wheel of cheese (FIGS. 1-2) or a tree stump (FIGS. 3-6). However, it is envisioned that other shapes for the housing 10 are contemplated by the present invention and does not form a limitation on the functionality of the present invention, and can be any other shape with which an animal, in particular, a domestic pet, such as a dog, cat, or hamster may interact.

The housing 10, according to the preferred embodiment, is comprised of an upper top 10a forming and covering a hollow bottom 10b. The hollow bottom 10b forms an operational cavity, and the upper top 10a forms an outer housing for holding and obscuring a motorized mechanism 50. An access/egress port 15 is formed within a side wall of the outer housing. The port 15 provides access to a cavity 10b that is otherwise obscured by the housing. A propeller-like blade mechanism 20 is driven by the motorized mechanism (not shown) that is in direct operational connection therewith, to provide a reciprocating motion that moves back and forth in a random manner. Further, as the blade mechanism rotates downdraft is generated. The blade mechanism 20 is anticipated as having an airfoil 25 for creating a minor airflow out the egress port 15 when in motion. A ribbon-like flexible, elongated target 30 is attached at one end to the distal end of the blade 25.

It is anticipated that the use of a motor that incorporates a stop/start/reverse function, or in a randomized pattern, will further cause the random in and out casting of the ribbon-like flexible, elongated target 30; hence, along with the blade 20 causing the airflow outward oldie egress port 15, the stop/start/reverse function of the blade causes random in-and-out casting of the target 30.

It should be understood that the target 30 can extend various distances out of the housing and that the distance that the object may extend may be adjustable. The disclosure is intended to describe preferred embodiments of the present invention.

It should be further understood that the undulating, reciprocated target is the key interactive feature of the present invention, and that it may be enclosed in any shape housing and that the housing 10 depicted in the figures is shown by way of example only. For example, a pet toy object may take on many shapes, and simulations, such as other animals, cartoon characters, bones, balls, sticks, newspapers, slippers, balls of yarn, or a plethora of other shapes sparking interest in a pet.

2. Operation of the Preferred Embodiment

As the blade 20 circulates, a slight airflow is created forming a draft outward from the egress port 15. This draft tends to carry the ribbon-like target 30 out the egress port 15. A vortex flow motion of the draft will cause the target 30 to undulate, or "wave". Simultaneously, as the blade 20 circulates the target 30 will be drawn into and released from the egress port 15 in a reciprocating fashion. It has been found that in using such a device, the appearance of a mouse tail is provided that darts in and out randomly, creating a surprising effect that stimulates a cat in an enjoyable fashion. Further, the movement of the target or tail within the housing makes noise as is flashes back and forth in front of the opening, further stimulating a cat. Pets are stimulated by and enjoy just the movement of the tail 30 back-and-forth behind the egress port 15 within the housing 10b. The pets will interactively investigate where the tail travels as they hear it flashing back-and-forth against the interior of the housing 10b. As it repeatedly pops out to tease them, these pets are enticed to try to capture the run-away mouse before it travels back through the egress port 15.

Additionally, other interactive stimulation is anticipated as being incorporated in conjunction with the 'waving tail' visual stimulation provided, such as the incorporation of a sound device 60 that preferably emits a prerecorded sound in response to movement or propulsion/retraction of the pet. This prerecorded sound can be a "permanent" prerecorded sound such as an animal's voice, such as "meow" or "purr," a beeping sound, a human voice, laughter, such as "ha, ha, ha" or some other desired sound, or can be recorded, and re-recorded, as desired, by the user. The prerecorded sound may continue for a predetermined time period, for example five (5) seconds, and then stops or may continue as long as the sound device is sensing motion of pet. Preferably, the sound simulates a natural prey of the pet, the pre-recorded sound is a simulated sound being reflective of the sound made by the natural prey, i.e., squeak for a mouse or chirp for a bird.

The foregoing descriptions of specific embodiments of the present invention have been presented for purposes of illustration and description and are not intended to be exhaustive or to limit the invention to the precise forms disclosed. Obviously many modifications and variations are possible in light of the above teaching. The embodiments were chosen and described in order to best explain the principles of the invention and its practical application, and enable others skilled in the art to best utilize the invention and various embodiments. It is intended that the scope of the invention be defined by the Claims appended hereto and their equivalents. Therefore, the scope of the invention is to be limited only by the following claims.

What is claimed is:

1. An interactive pet toy comprising:

a housing formed to an aesthetic shape and having an upper top forming and covering a hollow bottom, said hollow bottom forming an operational cavity, and said upper top forming an outer housing for holding and obscuring a motorized mechanism;

an access/egress port formed within a side wall of said outer housing, said port for providing access to said cavity that is otherwise obscured by the housing;

a blade mechanism operationally connected to and driven by said motorized mechanism that provide circulating motion;

an airfoil formed on said blade for creating a minor airflow out the egress port when in motion; and a flexible, elongated target attached at a distal end of the blade, wherein said airflow causes said ribbon to extend through said egress port and rotation of the blade mechanism causes said ribbon to retract in said housing after said blade mechanism rotates past said egress port.

2. The interactive pet toy of claim 1, wherein said target can extend various distances out of the housing and that the distance that the target may extend is adjustable.

3. The interactive pet toy of claim 1, wherein as said blade circulates, a slight airflow is created forming a drag outward from the egress port and forms a vortex flow motion such that said draft will cause said target to undulate.

4. The interactive pet toy of claim 2, wherein said target is drawn into and released from the egress port in a reciprocating fashion.

5. The interactive pet toy of claim 1, wherein said motorized mechanism incorporates a stop/start/reverse function.

6. The interactive pet toy of claim 1, further comprising a sound device that emits a prerecorded sound in response to movement.

7. The interactive pet toy of claim 6, wherein said prerecorded sound simulates a sound being reflective of the sound made by a natural prey.

* * * * *